United States Patent [19]

Silverman et al.

[11] 4,058,790
[45] Nov. 15, 1977

[54] METHOD AND APPARATUS FOR TRANSMITTING GEOPHONE SIGNALS OVER CABLES WITH MINIMUM NOISE

[75] Inventors: Daniel Silverman, Tulsa, Okla.; J. Robert Fort, Altadena, Calif.

[73] Assignee: Geophysical Systems Corporation, Pasadena, Calif.

[21] Appl. No.: 665,808

[22] Filed: Mar. 10, 1976

Related U.S. Application Data

[63] Continuation-in-part of Ser. No. 626,129, Oct. 28, 1975, which is a continuation-in-part of Ser. No. 358,077, May 7, 1973, Pat. No. 4,001,768.

[51] Int. Cl.² ............................................. G01V 1/22
[52] U.S. Cl. ..................... 340/15.5 TS; 340/15.5 FC; 340/15.5 DP
[58] Field of Search ............... 340/15.5 DP, 15.5 TS, 340/15.5 FC; 325/30

[56] References Cited

U.S. PATENT DOCUMENTS

| | | | |
|---|---|---|---|
| 3,271,588 | 9/1966 | Minc | 325/30 |
| 3,305,634 | 2/1967 | Rusick | 325/30 |
| 3,748,638 | 7/1973 | Montgomery, Jr. et al. | 340/15.5 DP |
| 3,883,725 | 5/1975 | Fort et al. | 340/15.5 DP |
| 3,911,226 | 10/1975 | Angelle et al. | 340/15.5 TS |
| 3,988,712 | 10/1976 | Ezell et al. | 340/15.5 TS |

*Primary Examiner*—Howard A. Birmiel
*Attorney, Agent, or Firm*—Daniel Silverman

[57] ABSTRACT

In a seismic system in which signals from a plurality of geophones are carried by pairs of conductors to each of a plurality of array terminals, where the geophone signals are converted to square wave signals, and on successive commands, the square wave signals are sampled, the samples are temporarily stored, and are then transmitted to storage means, the improved method of transmitting the geophone signals from the geophones to the array terminals, comprising; amplifying and square waving the geophone signals at the geophones, and transmitting the square wave signals to the array terminals. Included also are steps to modulate carrier signals in synchronism with the square wave signals to form bursts of carrier signals which are transmitted to the array terminals, where the bursts of carrier signals are detected and the square wave signals are regenerated, and sampled.

12 Claims, 7 Drawing Figures

METHOD AND APPARATUS FOR TRANSMITTING GEOPHONE SIGNALS OVER CABLES WITH MINIMUM NOISE

CROSS REFERENCE TO RELATED APPLICATION AND PATENTS

This application is a continuation in part of copending application Ser. No. 626,129, Fort et al, filed Oct. 28, 1975, entitled: Data Acquisition, Transport and Storage System: which is a continuation in part of Ser. No. 358,077, Fort et al filed May 7, 1973, now U.S. Pat. No. 4,001,768, having the same title. It is also related to U.S. Pat. Nos. 3,881,166 and 3,883,725.

BACKGROUND OF THE INVENTION

In the oil industry the use of the seismic method of geophysical exploration has generally involved the use of multiple individual independent amplifier channels connected to separate two conductor cables to a geophone unit, which might include one or a plurality of geophones. The amplifiers are designed to be as free of amplitude and phase distortion as possible, since the record of the geophone signal involves the precise measurement of amplitude at discrete digitizing times, to a precision of 12-16 bits, or more.

Noise and distortion can modify the geophone analog signal during its transmission from the geophone to the amplifier. Thus special attention has been devoted to the design of the cables, and individual conductor pairs have been provided for each amplifier channel, to minimize cross talk, noise and distortion.

Also, it has become quite common to use seismic line amplifiers, positioned at the geophones to linearly amplify the geophone analog signals before transmission over the cable, so as to have a stronger signal and to minimize noise distortion.

More recently a new system of seismic data acquisition has been perfected (see U.S. Pat. Nos. 3,881,166 and 3,883,725) in which the geophone signals, in contrast with conventional practice of digitizing to 12-16 bits, are digitized only to one bit. The amplification and digitization are done in each of a plurality of array terminals, which transmit the 1 bit digital signals as trains of single bits along a single two conductor cable which passes serially through each of the array terminals.

The geophone signals which are amplified and digitized to one bit in the array terminals, can be transmitted as square wave one bit digital signals on a time shared basis, for all of the array terminals, over a single pair of conductors, with a minimum of distortion and error.

The use of this transmission circuit for the major part of the distance from the geophones to the recording truck, minimizes the cable problem, to the extent that the individual analog geophone signals are only transmitted over short lengths of cables, which are about 1/Nth of the conventional length, where N equals the number of array terminals.

However, as of prior to this invention, there is still analog signal transmission over individual cables, which can still cause noise, and phase and amplitude distortion. It is customary also to include high fidelity seismic line amplifiers at the geophones to minimize distortion in the signals that reach the array terminals, all of this at greater expense in time and money.

It is therefor a primary object of this invention to simplify the transmission of geophone signals to the array terminal, and make the signals less sensitive to noise and phase distortion in the cables.

It is a further object of this invention to provide a system for transmission of geophone signals to array terminals whereby all geophone signals going to a single array terminal can be carried on a single pair of conductors.

SUMMARY OF THE INVENTION

These and other objects are realized and the limitations of the prior art are overcome in this invention, wherein the geophone signals are amplified at the geophone and converted to square wave signals, and the square wave signals are transmitted to the array terminals, where the square waves are re-formed, sampled, stored, etc.

This invention contemplates also that the square wave signals generated at the geophones can be used to modulate a single carrier signal, or two carrier signals, of different frequencies, to provide a set of spaced bursts of carrier signal synchronous with a first half cycle of the signal, such as the positive or negative half cycles, or successive alternate bursts of two different carrier frequencies, etc.

Other means of coding the times of rise and/or fall of the square wave can be done, with appropriate decoding of the transmitted coded square wave signal at the array terminal, so that the original square wave signal can be reconstructed, etc.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENTS

Figure 1:
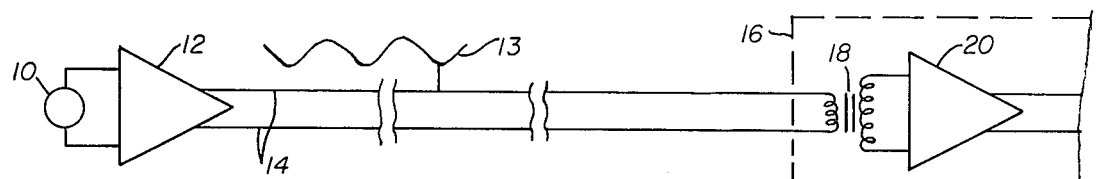
FIG. 1 illustrates a prior art 16 bit system.

Reference is made to the drawings, and in particular to FIG. 1, which represents the prior art system for transmitting geophone signals to a seismic amplifier. A geophone 10 is connected to a pair of conductors 14, or alternatively, through a seismic line amplifier 12 to the conductors 14. The oscillatory analog signal represented by 13 travels along the cable pair 14 to the input of amplifier 16. The input leads generally go to an input transformer 18 to get voltage gain with minimum of distortion and noise, and also to isolate the amplifiers from the cables. This art is well known and need not be described in detail.

The important points about the system of FIG. 1 are the long distance transmission of analog signals from the farthest end of the cables 14 to the amplifier in the recording truck, and the use of high gain, binary-gainranging amplifiers to digitally record amplitudes to a precision of 16 bits or more.

Figure 2:
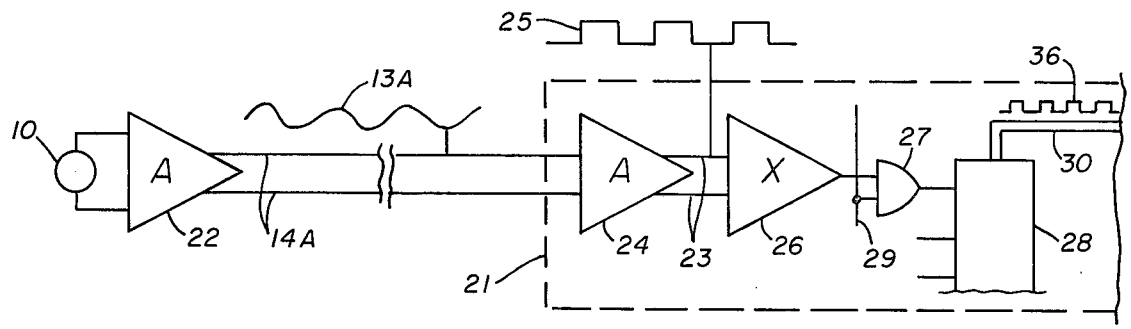
FIG. 2 illustrates a prior art 1 bit system.

In FIG. 2 is illustrated a more recent type of seismic system which operates on a quite different basis. This new system is fully described in U.S. Pat. Nos. 3,881,166 and 3,883,725, to which reference has been made. In this system, the geophone 10 is connected directly, or through a seismic line amplifier 22, to the two conductor cable 14A. The analog signal, represented by the trace 13A is an oscillatory analog signal similar to those shown as 13 in FIG. 1. However, the length of cable 14A is just sufficient to connect the geophone to the nearest array terminal. In general this will be about 1/16 of the length of cable 14, of FIG. 1.

In FIG. 2 the analog signal 13A goes to the array terminal 21 shown in dashed outline, and to an amplifier 24, for high gain linear amplification. The amplified signal then goes to a high gain saturating amplifier 26, that provides a square wave signal such as shown in trace 25, that has the same zero axis crossing points as the signal 13A. This is called an axis crossing coder, and converts the quasi-sinusoidal analog signal of varying amplitude 13A to a square wave of unity amplitude, that has the same times of axis crossing as the signal 13A.

The square wave signal 25 then goes to gate 27 and to a parallel to serial converter, or storage register 28. The second input to gate 27 is provided on line 29, which provides a short aperture time positive pulse, at each digitizing interval. This pulse enables the gate 27 and places a unit value in the storage element of 28 that represents an instantaneous sample of the square wave 25 at the time of the pulse. This sampling of the square wave is a means of digitizing the analog signal 13A to 1 bit, at those intervals when the enabling pulse is placed on lead 29.

The digital signals stored in parallel in 28 by the sampling process for each of the geophone leads 14A, are then read out of the storage register 28, in series, and transmitted over the two conductor cable 30 to the next array terminal, and on to the next array terminal, etc. and finally to a storage means, such as a magnetic disc, for example. These signals, represented by trace 36 are a train of one bit digital signals, each representing the amplitude (zero or 1) of each geophone signal at the last sampling time.

It will be clear from the description of FIG. 2 that a high fidelity analog signal 13A is sent by individual wire pairs 14A to the array terminal 21. Here the wave shape of the analog signal 13A is ignored, and the amplitude information is rejected, utilizing only the information as to whether the signal is positive or negative at the instant of digitization, or sampling. However, the phase or time information represented by the zero axis crossing time, is faithfully recorded.

As has been fully taught in U.S. Pat. Nos. 3,881,166 and 3,883,725, if there is a random noise of selected statistical character included with the signal 13A, of selected relative amplitude, that the original amplitude information, or wave shape, of the signal 13A can be recovered substantially completely by repeating the process of initiating a seismic signal, detecting, transmitting, zero axis crossing coding, sampling and transmitting, and adding or stacking, in true time phase, the several digital successive signals.

We have discovered that instead of amplifying the geophone signal 13A at 22 and transmitting it over the cable 14A to the array terminal as a sinusoidal signal, where it is axis crossing coded, we can axis crossing code the signal 13A at the geophone, and transmit a square wave from the geophone to the array terminal. We have found, as shown in FIG. 2, that the square wave digital pulses 36 are transmitted without error in the time interval between axis crossing points. Therefor a square wave of the geophone signal such as 38, would likewise be transmitted without phase error.

Figure 3:
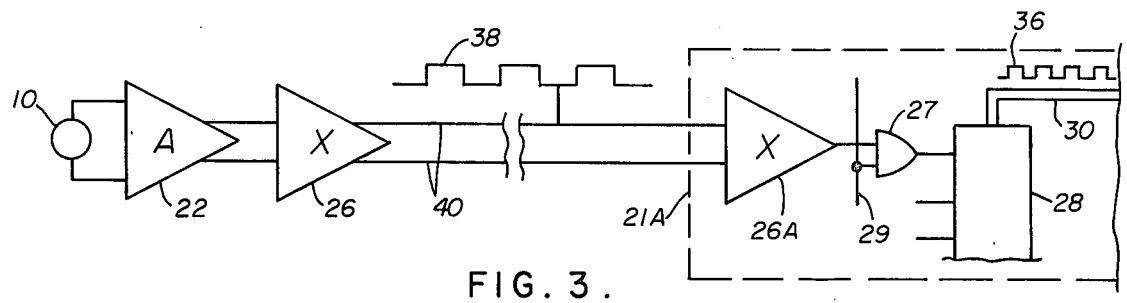
FIG. 3 illustrates one embodiment of this system as applied to the system of FIG. 2.

Referring now to FIG. 3 there is shown one embodiment of this invention. The geophone 10 sends its analog signal (like 13A) to the adjacent amplifier 22. This then goes to an axis crossing coder amplifier 26, which is similar to the corresponding amplifier 26 of FIG. 2. In other words, the axis crossing coding step is moved from the array terminal 21 to the geophone 10. The signal on cable 40 is then as represented by trace 38, which is a square wave having the same same axis crossing times as the geophone analog signal 13A. The signal 38 is shown with wide square waves (like 25) to distinguish it from the signals 36, which are digital pulses, which although they are individual square waves, are of very short time duration.

This square wave signal 38 is then transmitted by cable pair 40 to the array terminal 21A, where it goes to another square wave amplifier 26 which, while maintaining the same phase, squares up the signal 38 and passes it on to the sampling gate 27 and storage 28 as in FIG. 2. It is thus clear that from the point of view of the gate 27, it cannot tell whether the geophone signal 13A is axis crossing coded in the array terminal as in FIG. 2, or at the geophone, as in FIG. 3. And, since there is no phase error introduced in the square wave 38 transmission over cable 40, and since the amplitude information in 13A is not utilized at 21, it is clear that there is no deterioration of signal (phase, time) fidelity in FIG. 3 as compared to FIG. 2.

With the system of FIG. 3, it is clear that only 1 geophone group signal can be carried per conductor pair. However, as shown in FIG. 4, by modulating a constant frequency carrier signal by the square wave, and by using a different frequency, or phase, for each geophone group, a plurality of geophone signals can be transmitted over a single conductor pair.

Figure 4:
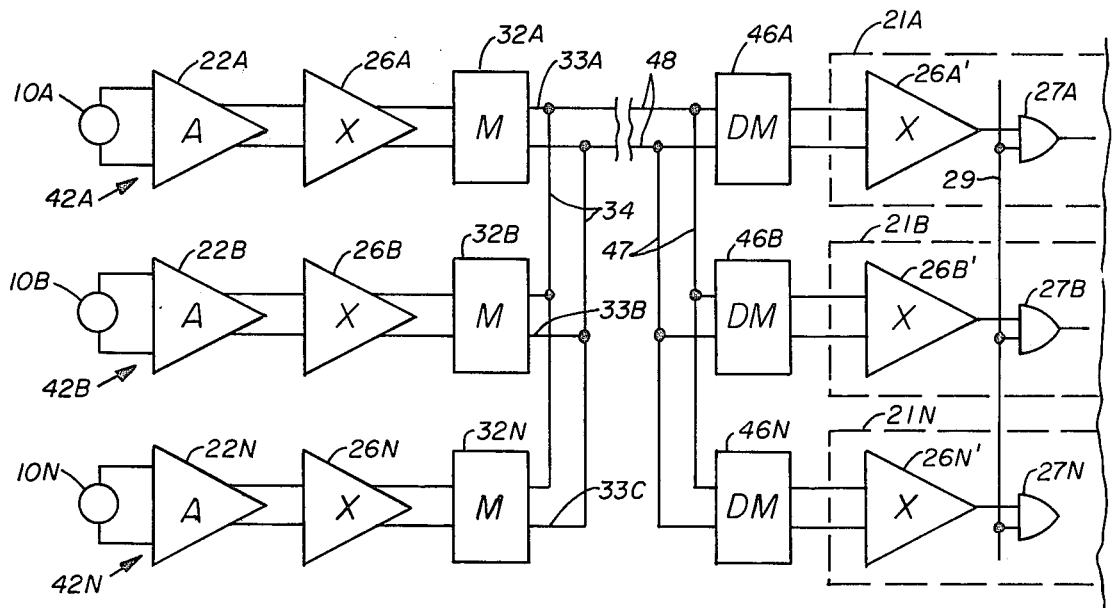
FIG. 4 illustrates a second embodiment of the system of this invention in which a plurality of geophone signals are transmitted over a single pair of conductors.

Referring to FIG. 4, there is shown schematically such a system. There are shown a plurality of geophone groups 10A, 10B, . . . 10N. These are individually connected to separate channels 42A, 42B . . . 42N, each being similar to the others. The channels 42 comprise an amplifier 22 and axis crossing amplifier or coder 26. These ae similar to those of FIG. 3, and each outputs a square wave signal like 38.

These square wave signals go to individual modulators 32A, 32B . . . 32N. The modulators comprise carrier signal oscillators, each of a different frequency. For example, the demodulator 46A will be tuned to respond only to the modulated output signal of modulator 32A, so that each burst of output carrier from 32A onto line 48 and to demodulators 46, will call for a response only from 46A, which will than output a square wave signal like 38, which will be of identical phase to that supplied by 26A to modulator 32A. This square wave resulting from the demodulation in 46A will then go to coder 26A' to be "squared up" and then to sampling gate 27 and converter 28 as in FIG. 3.

Likewise, the decoders 46B . . . 46N will respond only to the modulators or coders 32B . . . 32N to receive and transmit the square wave signals from their corresponding geophone channels.

Figure 5:
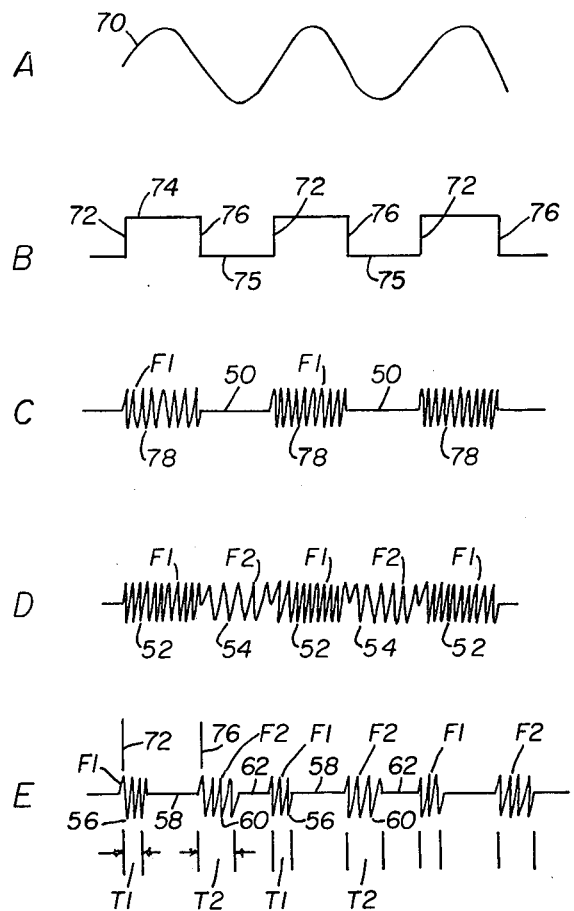
FIG. 5 illustrates a plurality of coding systems.

Following the system of FIG. 4, there are many ways of coding or modulating the square wave signals 38 at the geophone. Some of these are illustrated in FIG. 5, where in trace A, is shown a simple sine wave signal 70. Trace B represents the square wave 38 which is outputted by the axis crossing coders 26A etc. The square waves comprise vertical rising legs 72 that rise to a unit amplitude, where the signal element 74 is of constant amplitude, to a time where the trace drops vertically 76 to a negative value (or zero) 75 until the next rise 72, and so on.

Trace C represents a simple ON-OFF modulation of an oscillator to produce a signal 78 of frequency F1 during the first half cycles of the square wave signal B. That is, the output of modulators 32A is a burst of signal of frequency F1 during the time of signal 74. As is well known (and illustrated in FIG. 2) in the array terminal 21 the gate 27 passes the signal from 26 during the time that trace 13 is positive. That is, the burst of F1 continues during the time 74. During the time 75 when the square wave B is zero or negative, there is no transmission, and the trace 50 is quiet.

It is possible also to provide a second oscillator of frequency F2, and by appropriate gating (in opposite phase to that for F1) the transmitted signal as in trace D will comprise consecutive contiguous bursts of carrier signal of F1, F2, F1, F2, etc. each half cycle.

Figure 7:
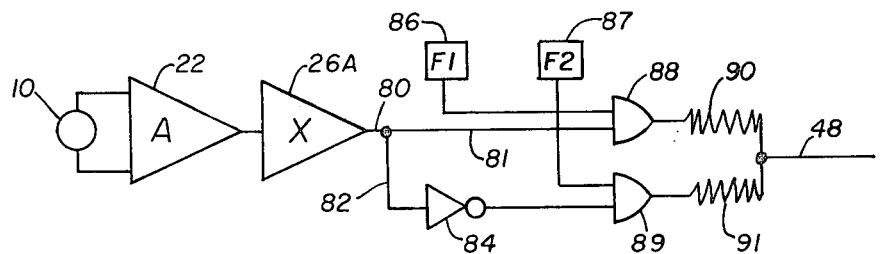
FIG. 7 illustrates a system using one of the coding systems of FIG. 5.

The signal in D can be produced by the apparatus as in FIG. 7. There are two oscillators 86 of F1 and 87 of F2. These are connected to gates 88, 89, the outputs of which are connected through adding resistors 90, 91 to a common junction and to line 48. The square wave output 38 of coder amplifier 26A goes one line 80 to line 81 to gate 88, and also through line 82 and inverter 84 to gate 89.

Thus when line 80 is positive (74) oscillator F1, 86 is gated through 88 to line 48, and when line 80 is negative or zero, the inverter 84 makes this positive and enables gate 89 to pass F2 from oscillator 87 to line 48. This apparatus passes the successive bursts 52, 54 as in trace D.

In transmitting the signal (trace D) from the geophone, the current drain to power the cable 48 is on continuously. FIG. 5 trace E shows a coding method (still using oscillators) wherein the time of rise 72 causes a short burst 56 of carrier signal F1 for a time T1, which is gated to line 48. Thereafter, for the rest of the half cycle 74, the signal is zero 58. When the half cycle ends 76, the second oscillator F2 is gated on for a period T2, and then is off 62 for the rest of the half cycle. This will effect a saving in power in proportion to the time ratio of T1 to 74, etc.

The time durations T1, T2 can be the same or they can be different. If they are different, the frequencies F1, F2 can be the same, and the information as to whether a burst represents the rise 72, or the fall 76 can be determined from T1 and T2. So by making these burst times different, a single frequency can be used.

Figure 6:
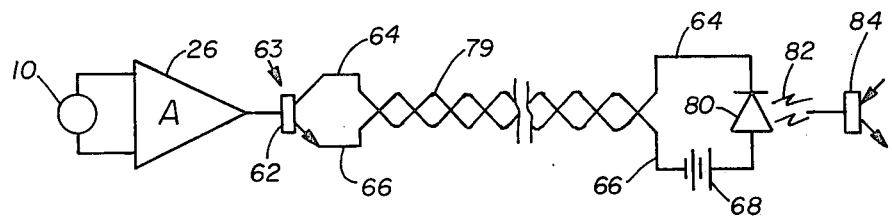
FIG. 6 illustrates a modification of the system of FIG. 3.

In FIG. 6 is illustrated how the square wave of voltage or current 38 in FIG. 3 can be used to control a light emitting diode (L.E.D.) 80, to optically couple the cable square wave signal 38 to a photodetector 84 through the emitted light 82 to the decoder 46 of FIG. 4, for example.

In FIG. 6, the battery 68 causes a current to flow through the LED 80 and line 64, through cable conductors 79 to a transistor 63. The transistor 63 is driven through its base 62 by the square wave coder 26. So the square wave controlling 62 controls the light emitted by LED 80, in the form of alternate periods of luminosity and darkness. The output of the photo sensor 84 goes to 26A' of FIG. 4, for example, and to sampling gate 27, etc.

Other systems of coding the square wave at the geophone, and decoding it at the array terminal, can be provided. There are many of these coding systems which are well known such as matched filters, or the use of sweep or chirp signals and correlation, etc.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. In a 1 bit digital geophone signal acquisition and transmission system having a plurality of array terminals, each of which receives a plurality of analog signals from a plurality of geophones connected respectively to a plurality of different pairs of conductors, and in said array terminals of said system said plurality of analog signals are amplified at constant gain and on command are sampled and digitized to 1 bit, the improvement in the method of transmission of said plurality of analog geophone signals from said geophones to said array terminals, comprising the steps of:
   a. at each of said plurality of geophones, amplifying at constant gain and zero crossing coding each of said analog geophone signals to form square wave analog signals; and
   b. transmitting each of said square wave analog signals to said array terminals over separate pairs of conductors.

2. The method as in claim 1 including in said array terminals, the steps of:
   a. regenerating said square wave analog signals; and
   b. on command sampling and digitizing to 1 bit said square wave analog signals.

3. In a 1 bit digital geophone signal acquisition system having a plurality of array terminals, each of which receives analog signals from a plurality of geophones connected respectively to a plurality of pairs of conductors, and in the array terminals of said system said analog signals are zero crossing coded and on command are sampled and digitized to 1 bit, the improvement in the method of transmission of said analog geophone signals from said geophones to said array terminals comprising the steps of;
   a. in the vicinity of each of said plurality of geophones, amplifying and zero crossing coding said analog geophone signals to form square wave analog signals;
   b. coding each of said square wave analog signals in a selected manner to form coded square wave analog signals;
   c. transmitting said coded square wave analog signals to said array terminals;
   d. at said array terminals decoding each of said coded square wave analog signals; and
   e. reconstructing said square wave analog signals.

4. The method as in claim 3 in which said step of coding said square wave analog signal comprises the step of modulating a first carrier signal with said square wave analog signal so as to provide a burst of said first carrier of constant amplitude for the duration of each of the first half cycles of said square wave.

5. The method as in claim 4 including the additional step of modulating a second carrier signal with said square wave analog signal so as to provide a burst of said second carrier signal of constant amplitude for the duration of each of the second half cycles of said square wave analog signals.

6. The method as in claim 5 including in said array terminal the steps of detecting said bursts of first and second carrier signal and regenerating said square wave analog signal.

7. The method as in claim 6 in which said first carrier signal is a constant frequency signal of frequency F, and in which said bursts of carrier signal are detected by means of a frequency sensitive circuit means tuned to a frequency of F.

8. The method as in claim 5 including the additional steps of providing a second square wave analog signal from another geophone, and modulating a third and a fourth carrier signal with said second square wave analog signal so as to provide alternating bursts of said third and said fourth carrier signals in synchronism with the first and second half cycles of said second square wave analog signal.

9. The method as in claim 8 in which said bursts of first, second, third and fourth carrier signal are transmitted over the same pair of conductors.

10. In a 1 bit digital geophone signal acquisition system having a plurality of array terminals, each of which receives analog signals from a plurality of geophones connected respectively to a plurality of pairs of conductors, and in the array terminals of said system said analog signals are zero crossing coded and on command sampled and digitized to 1 bit, the improvement in the method of transmission of said analog geophone signals from said geophones to said array terminals for minimum noise contamination comprising the steps of:
  a. in the vicinity of each of said plurality of geophones, amplifying and zero crossing coding said geophone signals to form square wave signals;
  b. generating a first burst of carrier signal of frequency $F_1$ and time duration of $T_1$ less than ½ cycle synchronized with each of the voltage rises of said square wave signal;
  c. generating a second burst of carrier signal of frequency $F_2$ and time duration $T_2$, less than ½ cycle, synchronized with each of the voltage falls of said square wave signal; and
  d. in said array terminal detecting said bursts of carrier signal of frequencies $F_1$ and $F_2$ and regenerating said square wave signal.

11. The method as in claim 10 in which said time periods T1 and T2 are equal and frequencies F1 and F2 are different.

12. The method as in claim 10 in which said time periods T1 and T2 are different, and frequencies F1 and F2 are the same.

* * * * *